United States Patent
Suzuki

(10) Patent No.: US 9,825,339 B2
(45) Date of Patent: Nov. 21, 2017

(54) BATTERY PACK

(71) Applicant: MITSUBISHI JIDOSHA KOGYO KABUSHIKI KAISHA, Tokyo (JP)

(72) Inventor: Koichi Suzuki, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 486 days.

(21) Appl. No.: 14/518,437

(22) Filed: Oct. 20, 2014

(65) Prior Publication Data

US 2015/0111076 A1    Apr. 23, 2015

(30) Foreign Application Priority Data

Oct. 21, 2013 (JP) ................................. 2013-218193

(51) Int. Cl.
*H01M 10/48* (2006.01)
*H01M 10/42* (2006.01)
*H02J 7/00* (2006.01)

(52) U.S. Cl.
CPC ......... *H01M 10/425* (2013.01); *H01M 10/48* (2013.01); *H02J 7/0021* (2013.01); *H01M 2010/4271* (2013.01); *H01M 2010/4278* (2013.01); *H01M 2220/20* (2013.01); *Y02T 10/7055* (2013.01)

(58) Field of Classification Search
CPC .... H01M 10/42; H01M 10/425; H01M 10/48; H01M 2/02; H01J 7/0021; H01J 7/0013; H01J 7/0026; H01J 7/0031
See application file for complete search history.

(56) References Cited

U.S. PATENT DOCUMENTS

| | | | |
|---|---|---|---|
| 5,773,962 A | 6/1998 | Nor | |
| 6,399,239 B2* | 6/2002 | Bolstad | B60K 1/04 429/100 |
| 2009/0027056 A1* | 1/2009 | Huang | B60L 11/1857 324/439 |
| 2010/0007481 A1* | 1/2010 | Uchida | H01M 10/42 340/455 |
| 2010/0104929 A1 | 4/2010 | Schafer et al. | |

(Continued)

FOREIGN PATENT DOCUMENTS

| | | |
|---|---|---|
| DE | 10 2008 052 986 A1 | 4/2010 |
| DE | 10 2009 020 178 A1 | 11/2010 |

(Continued)

OTHER PUBLICATIONS

Extended European Search Report dated Mar. 27, 2015 in corresponding European Application No. 14 18 9629.

(Continued)

*Primary Examiner* — Kenneth Douyette
(74) *Attorney, Agent, or Firm* — Birch, Stewart, Kolasch & Birch, LLP

(57) ABSTRACT

A battery pack for housing plural secondary batteries inside a case includes a battery management unit for managing states of the plural secondary batteries, an information transfer circuit which is connected to the battery management unit and transfers information about the secondary batteries to the battery management unit, and a diagnostic circuit which is branched and formed from the information transfer circuit and is extended to an outer surface of the case.

7 Claims, 4 Drawing Sheets

(56) References Cited

U.S. PATENT DOCUMENTS

| | | | |
|---|---|---|---|
| 2011/0248680 A1 | 10/2011 | Timmons et al. | |
| 2011/0313613 A1* | 12/2011 | Kawahara | H01M 10/441 701/34.4 |
| 2012/0004798 A1 | 1/2012 | Sakamoto et al. | |
| 2012/0221266 A1 | 8/2012 | Kuroda et al. | |
| 2013/0031318 A1* | 1/2013 | Chen | H02J 7/00 711/154 |
| 2013/0037336 A1* | 2/2013 | Ojeda | B60K 1/04 180/68.5 |
| 2013/0154569 A1 | 6/2013 | Endo et al. | |
| 2013/0207614 A1 | 8/2013 | Schafer et al. | |

FOREIGN PATENT DOCUMENTS

| | | |
|---|---|---|
| JP | 2011-169870 A | 9/2011 |
| JP | 2012-16163 A | 1/2012 |
| JP | 2012-181043 A | 9/2012 |
| JP | 2013-127893 A | 6/2013 |
| WO | WO 2010/128066 A2 | 11/2010 |

OTHER PUBLICATIONS

European Office Action dated Jan. 27, 2017 issued in corresponding European Application No. 14 189 629.0.
European Office Action dated Jul. 17, 2017 issued in corresponding European Application No. 14 189 629.0.
Japanese Office Action and English translation thereof, dated Jun. 21, 2017, for Japanese Application No. 2013-218193.

* cited by examiner

BATTERY PACK

BACKGROUND

The present invention relates to a battery pack for housing plural secondary batteries inside a case.

Conventionally, the inside of a battery pack for travel used in an electric vehicle or a hybrid vehicle is equipped with plural battery modules. The battery module is an assembled battery made by mutually connecting plural battery cells (cells). By managing multiple battery cells in a battery module unit, proper arrangement density or heat dissipation properties of the battery cells are ensured while increasing a total output voltage of the whole battery pack.

In each of the battery modules, a cell monitoring unit (CMU) is installed as an electronic controller for acquiring, managing and monitoring temperatures or voltages of the individual battery cells and controlling and processing all or a part of the A/D conversion. For example, variations in voltage originating from charge and discharge characteristics of the individual battery cells are equalized in the battery module unit by the cell monitoring unit.

On the other hand, a battery management unit (BMU) for supervising all the battery modules is annexed as an electronic controller higher than the cell monitoring unit. The battery management unit manages a state of charge (SOC) or a state of health (SOH) of the whole battery for driving based on information about the battery cell managed in each of the cell monitoring units. A computation load is reduced by differentiating functions or the contents of control in each of the electronic controllers in this manner.

Incidentally, information acquired in the cell monitoring unit is aggregated in the battery management unit located in its high hierarchy, and is transferred to various electronic controllers of the vehicle side through a vehicle-mounted communication network. In many cases, the information acquired in the cell monitoring unit cannot be read out directly unless the information passes through the battery management unit. As a result, when a failure occurs in the battery management unit, it becomes difficult to grasp states of the individual battery cells.

In order to solve such a problem, a review of forming a connector for directly acquiring information from the battery cell of the inside of the battery pack is made. For example, it is contemplated to previously form a connector for external connection into which a probe is inserted in a position just over a positive terminal and a negative terminal of the battery cell in an outer surface of the battery pack. Such an idea can acquire information about the battery cell without passing through the battery management unit (see Patent Reference 1).

[Patent Reference 1] JP-A-2011-169870

SUMMARY

An object of the present invention is to improve serviceability and maintainability in a simple configuration for a battery pack for housing plural secondary batteries inside a case. In addition, the object of the present invention is not limited to this object, and action and effect which are derived from each configuration shown in a mode for carrying out the invention described below and cannot be obtained by a conventional art can also be positioned as other objects of the present invention.

(1) A disclosed battery pack for housing plural secondary batteries inside a case includes a battery management unit for managing states of the plural secondary batteries, an information transfer circuit which is connected to the battery management unit and transfers information about the secondary batteries to the battery management unit, and a diagnostic circuit which is branched and formed from the information transfer circuit and is extended to an outer surface of the case.

The battery management unit (for example, BMU) is an electronic controller for supervising the plural secondary batteries, and preferably manages a state of charge (SOC) or a state of health (SOH) of the whole battery pack.

In addition, when an outer surface of the battery pack is provided with a terminal, the diagnostic circuit may be connected to the terminal. Also, in the case of the battery pack whose outer surface is not provided with a terminal, the diagnostic circuit can be simply extended to the outside beyond the outer surface, or some terminal (connector) may be connected to its distal end side.

(2) The battery pack preferably includes a cell monitoring unit for monitoring states of the individual secondary batteries. The information transfer circuit may have a communication circuit for making connection between the battery management unit and the cell monitoring unit. The diagnostic circuit may have a first diagnostic circuit branched and formed from the communication circuit.

The cell monitoring unit (for example, CMU) preferably manages and monitors states of the individual secondary batteries and makes A/D conversions, and is preferably an electronic controller for individually monitoring the secondary batteries or an assembled battery (battery module) made by mutually connecting the plural secondary batteries. For example, temperatures or voltages of the assembled battery or the secondary batteries are preferably acquired, managed and monitored and A/D conversions are made every assembled battery.

(3) The battery pack may include a first power source line for supplying electric power to both of the battery management unit and the cell monitoring unit, a second power source line for supplying electric power to only the cell monitoring unit, and a breaking unit which is interposed in both of the second power source line and a portion between the cell monitoring unit and the battery management unit in the first power source line and breaks power feeding from the first power source line to the cell monitoring unit at the time of power feeding from the second power source line.

(4) The information transfer circuit may have an electric leak detecting circuit which is formed between the battery management unit and a high-voltage circuit related to charge and discharge of the secondary battery and detects an electric leak from the high-voltage circuit. The diagnostic circuit may have a second diagnostic circuit branched and formed from the electric leak detecting circuit.

In addition, the presence or absence of the electric leak from the high-voltage circuit can be checked by measuring an electric leak resistance value (or an electric leak current value) between the electric leak detecting circuit and a ground of a low-voltage circuit inside the battery pack. Or, the presence or absence of the electric leak can be checked by measuring an electric leak resistance value (or an electric leak current value) between the electric leak detecting circuit and a metal portion of the battery pack.

(5) The electric leak detecting circuit may have a first electric leak detecting circuit connected to a side of the secondary battery than a contactor interposed in the high-voltage circuit. That is, the first electric leak detecting circuit may be connected to the inside of the battery pack than the contactor.

(6) The electric leak detecting circuit may have a second electric leak detecting circuit connected to an outside of the battery pack than a contactor interposed in the high-voltage circuit. That is, the second electric leak detecting circuit may be connected to the outside of the battery pack than the contactor.

(7) The battery pack may include a current sensor for detecting a current value related to charge and discharge of the secondary battery. The information transfer circuit may have a current value detecting circuit for making connection between the current sensor and the battery management unit. The diagnostic circuit may have a third diagnostic circuit branched and formed from the current value detecting circuit.

DETAILED DESCRIPTION OF EXEMPLIFIED EMBODIMENTS

A conventional technique has a problem that work of acquiring information about a battery cell becomes troublesome since connectors for external connection must be prepared for all the battery cells housed inside a battery pack. Also, as the total number of battery cells of the inside of the battery pack increases, the number of connectors increases, and a structure of the battery pack becomes complicated and also the cost increases.

Also, the conventional technique has a problem that it is difficult to correctly decide whether or not a battery management unit fails. For example, when a signal from the battery management unit is not detected, it can be considered that its battery management unit fails. On the other hand, when an abnormal signal is detected from the battery management unit, it becomes difficult to determine whether its battery management unit fails or a battery cell or a cell monitoring unit located in the lower hierarchy fails.

The present invention has been implemented in view of the problems as described above, and an object of the invention is to improve serviceability and maintainability in a simple configuration for a battery pack for housing plural secondary batteries inside a case.

The battery pack for vehicle as an embodiment of the invention will be described with reference to the drawings. In addition, the embodiment shown below is only illustrative, and it is not intended to eliminate various modifications or technical applications which are not expressed in the following embodiment. In each configuration of the present embodiment, various modifications can be made without departing from the gist and also, a choice can be made from the modifications as necessary, or the modifications can be combined properly.

[1. Battery Pack]

Figure 1:
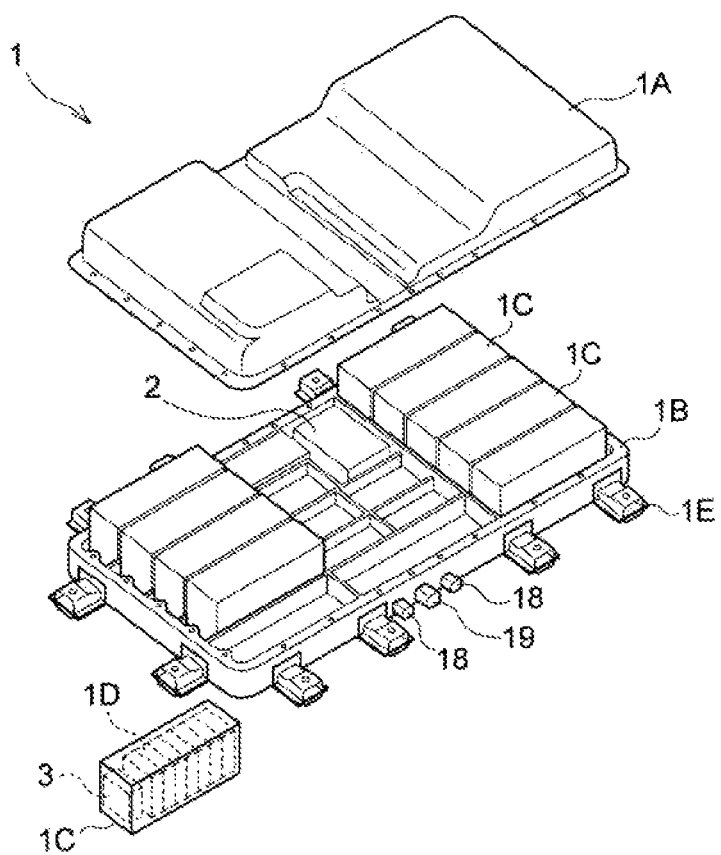
FIG. 1 is a perspective view illustrating a configuration of a battery pack according to one embodiment.

A battery pack 1 is a vehicle electric storage device in which plural battery modules 1C are accommodated inside a box-shaped container (case) formed by combining a battery cover 1A and a battery case 1B. A perspective view of FIG. 1 shows a state of detaching the battery cover 1A which is a lid member of the battery pack 1. The battery pack 1 of the present embodiment is mounted in a vehicle as a power source of a rotating electrical machine (an electrical motor, an electrical motor generator, etc.) related to driving of a vehicle-mounted engine or travel of the vehicle.

The inside of the battery case 1B is demarcated in a grid shape by partition plates, and the battery modules 1C are accommodated inside the respective demarcations. Also, a battery management unit 2 (BMU) and a pack air conditioner for regulating temperature or humidity of the inside of the case are accommodated on the battery case 1B. The battery management unit 2 is an electronic controller for supervising the pack air conditioner and all the battery modules 1C included in the battery pack 1, and has, for example, a function of A/D conversion (analog/digital conversion) of a control signal or a function of managing and monitoring states of the individual battery modules 1C.

The battery cover 1A and the battery case 1B are formed of, for example, a reinforcing resin or a metal plate for reinforcement, and are mutually fixed using any fastener. At this time, a sealing material (not shown) is interposed between a lower end side of the battery cover 1A and an upper end side of the battery case 1B to ensure watertightness and air-tightness of the inside of the battery pack 1.

Plural battery frames 1E for attaching the battery pack 1 to a vehicle are fixed to a bottom surface and a side surface of the battery case 1B. The battery frame 1E is obtained by bonding, for example, a metallic reinforcing member in a lattice shape, and is formed so as to extend in a vehicle width direction and a front-back direction of the vehicle at the time of attaching the battery pack 1 to the vehicle. Both ends of the battery frame 1E are fixed to the vehicle side (for example, a side member or a cross member of the vehicle) using any fastener.

The battery module 1C is an assembled battery made by mutually connecting plural cells 1D (cells). These cells 1D are connected by combining series connection or parallel connection according to design voltage, design capacity, etc. of the battery module 1C. Also, the inside of each of the battery modules 1C is provided with a cell monitoring unit 3 (CMU) as an electronic controller for acquiring and managing temperatures or voltages of the individual cells 1D included in the battery module 1C. The cell monitoring unit 3 is formed so as to be able to communicate with the battery management unit 2 through a vehicle-mounted network. The battery management unit 2 can control the cell monitoring unit 3.

Electrical circuits of the inside of the battery pack 1 are classified into a low-voltage system circuit and a high-voltage system circuit. The low-voltage system circuit is a circuit for actuating the electronic controller or the pack air conditioner, and is the circuit with, for example, a maximum voltage (standard voltage) of about 12 [V]. On the other hand, the high-voltage system circuit is a circuit (that is, a circuit related to charge and discharge of the battery pack 1) used in driving of a motor for travel mounted in the vehicle, and is the circuit with, for example, a voltage of 200 [V] or more. These low-voltage system circuit and high-voltage system circuit are electrically separated inside the battery pack 1, and conductive wires constructing the respective circuits are also formed separately.

A side surface of the battery case 1B is provided with a connector 18 of the low-voltage system circuit and a high-voltage system connector 19. The connector 18 of the low-voltage system circuit is a terminal for connecting, for example, a communication line, a ground line or a power source line of the cell monitoring unit 3 or the battery management unit 2. On the other hand, the connector 19 of the high-voltage system circuit is a terminal for connecting, for example, an electric power line related to charge and discharge of the battery pack 1.

The outside of the battery pack 1 in these connectors 18, 19 is provided with multiple sockets and pins corresponding to the ground line, a signal line, the electric power line, etc. described above. Also, the inside of the battery pack 1 is provided with a wire harness (not shown) for making connection between these connectors 18, 19 and the battery management unit 2, each battery module 1C, the cell monitoring unit 3, the pack air conditioner, etc.

Hereinafter, circuits of the battery pack 1 are described in a state in which the connectors 18, 19 are fixed to an outer surface of the battery pack 1, but it is unnecessary to fix these connectors 18, 19 to a side surface of the battery pack 1, or these connectors 18, 19 may be formed separately from the battery pack 1. For example, the above wire harness may be extended to the outside than an outer surface of the battery case 1B to provide the distal end side of the wire harness with some terminal (connectors 18, 19).

[2. Circuit Configuration]

Figure 2:
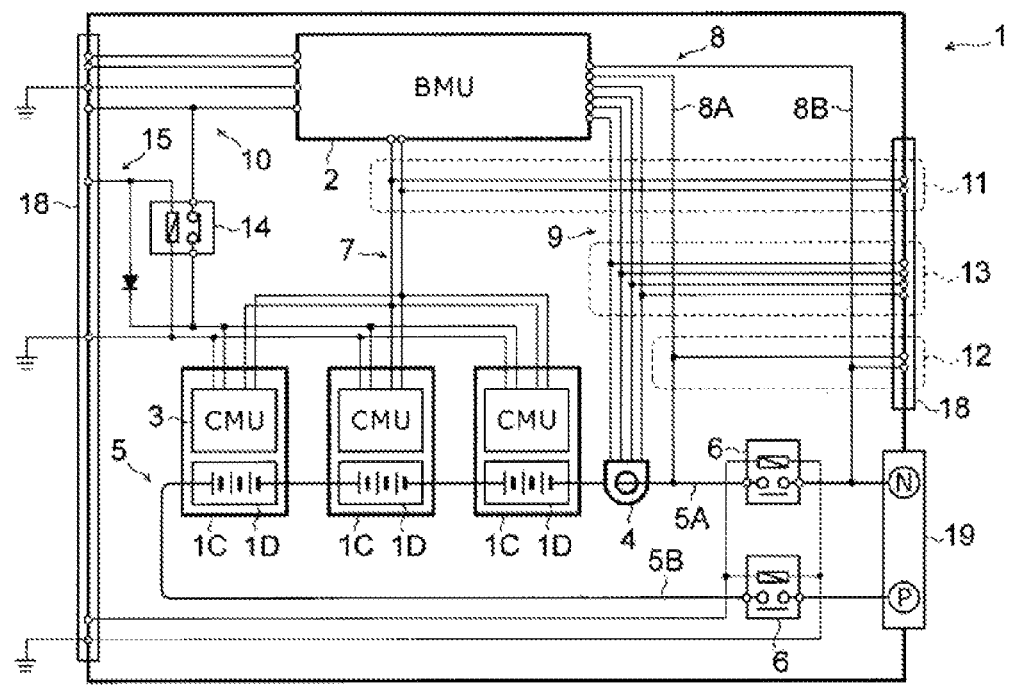
FIG. 2 is an electrical circuit diagram illustrating a circuit configuration of the inside of the battery pack of FIG. 1.

FIG. 2 is an electrical circuit diagram illustrating a circuit configuration of the inside of the battery pack 1. Here, only three battery modules 1C of the plural battery modules 1C accommodated inside the battery pack 1 are illustrated.

The battery management unit 2 is connected to the cell monitoring unit 3 by a communication circuit 7 for vehicle-mounted network. This communication circuit 7 is, for example, a CAN (Controller Area Network) communication network for sending and receiving a digital signal using a voltage difference between two signal lines (twist pair) as a code. On the communication circuit 7, the plural cell monitoring units 3 are connected in parallel with the battery management unit 2 to form a bus type network topology. In addition, the battery management unit 2 is connected so as to be able to communicate with various electronic controllers [for example, an EV-ECU (vehicle integration control unit) or a motor ECU] of the vehicle side through a vehicle-mounted network communication circuit different from the communication circuit 7.

The plural battery modules 1C are connected in series with a high-voltage circuit 5 connected to the high-voltage system connector 19. Hereinafter, in the high-voltage circuit 5, a circuit for making connection between the connector 19 and a negative electrode of the battery module 1C is called a minus side circuit 5A and a circuit for making connection between the connector 19 and a positive electrode of the battery module 10 is called a plus side circuit 5B.

A hole type current sensor 4 is interposed in the minus side circuit 5A. Also, the current sensor 4 is connected to the battery management unit 2 by a current value detecting circuit 9. Information about a current value detected by the current sensor 4 is transferred to the battery management unit 2 through the current value detecting circuit 9. Also, a contactor 6 for switching a connection and disconnection state of the high-voltage circuit 5 is interposed in each of the minus side circuit 5A and the plus side circuit 5B. The contactor 6 is a relay unit of a normally open type, and changes to a connection state when an energization voltage from the vehicle side is inputted, and changes to a disconnection state when the energization voltage is not inputted.

Figure 5:
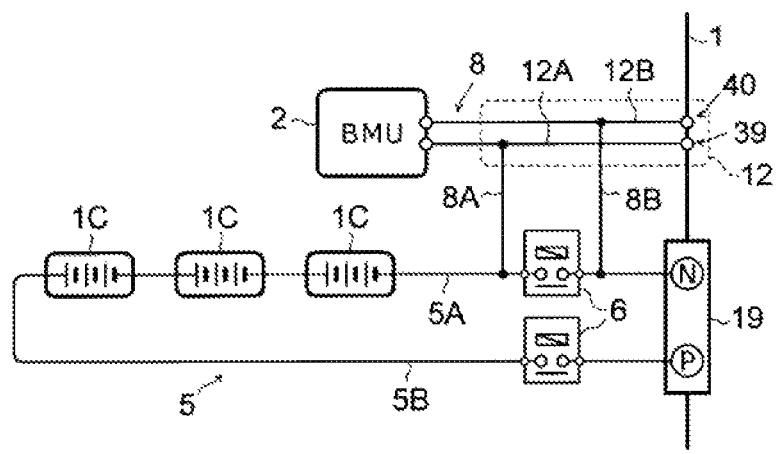
FIG. 5 is an electrical circuit diagram illustrating an electric leak detecting circuit in FIG. 2.

A position of the contactor 6 on the minus side circuit 5A is set in a position nearer to the connector 19 than the current sensor 4 as shown in FIG. 2. Also, an electric leak detecting circuit 8 branched and formed from the minus side circuit 5A is connected to both sides of the sandwiched contactor 6 on the minus side circuit 5A (FIG. 5). Hereinafter, one electric leak detecting circuit 8 branched from the portion between the current sensor 4 and the contactor 6 is called a first electric leak detecting line 8A. Also, the other electric leak detecting circuit 8 branched from the portion between the contactor 6 and the connector 19 is called a second electric leak detecting line 8B. Both of the first electric leak detecting line 8A and the second electric leak detecting line 8B are connected to the battery management unit 2.

[2-1. Power Source Circuit]

Figure 3:
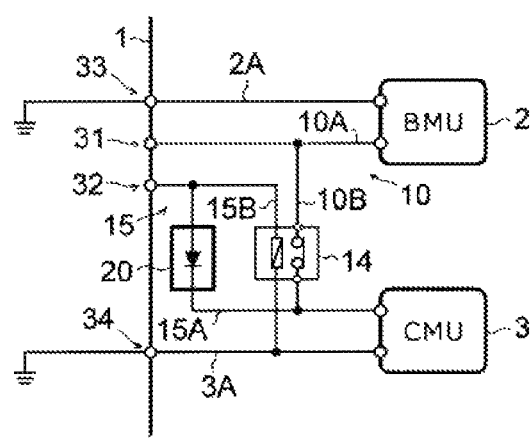
FIG. 3 is an electrical circuit diagram illustrating a power source circuit in FIG. 2.

FIG. 3 is an electrical circuit diagram illustrating a power source circuit of the battery management unit 2 and the cell monitoring unit 3. This diagram shows sockets 31 to 34 related to the power source circuit in plural sockets formed in the connector 18.

A first power feeding socket 31 is a socket which is connected to a low-voltage power source circuit (for example, a circuit with a 12 [V] battery) of a vehicle and supplies electric power to both of the battery management unit 2 and the cell monitoring unit 3. The first power feeding socket 31 is connected to the battery management unit 2 and the cell monitoring unit 3 by a first power source line 10. The first power source line 10 is halfway branched and formed to a BMU side power source line 10A and a CMU side power source line 10B, and supplies an operating current to both of the battery management unit 2 and the cell monitoring unit 3.

A ground socket 33 is a socket which is connected to a ground line 2A of the battery management unit 2 and gives a ground potential. Similarly, a ground socket 34 is a socket which is connected to a ground line 3A of the cell monitoring unit 3 and gives a ground potential.

A second power feeding socket 32 is a socket for supplying an operating current for actuating only the cell monitoring unit 3. The second power feeding socket 32 is connected to the cell monitoring unit 3 by a spare power source line 15. The spare power source line 15 is halfway branched and formed to a second power source line 15A and a relay driving line 15B. The second power source line 15A is a conductive wire connected to a power feeding line of the cell monitoring unit 3, and supplies electric power to only the cell monitoring unit 3.

The second power source line 15A is provided with a diode 20 for diffraction prevention. Accordingly, a backward flow of a current in the second power source line 15A or diffraction of a current from the side of the second power source line 15A to the side of the relay driving line 15B is prevented. On the other hand, the relay driving line 15B is connected to the ground line 3A of the cell monitoring unit 3. Further, a relay 14 for switching a connection and disconnection state of the CMU side power source line 10B is interposed in each of the relay driving line 15B and the CMU side power source line 10B.

The relay 14 is a normally closed type breaking unit for connecting the CMU side power source line 10B at the time of no power feeding from the second power feeding socket 32 and breaking the CMU side power source line 10B at the time of power feeding from the second power feeding socket 32. For example, when an external power source is connected to the second power feeding socket 32, the CMU side power source line 10B is broken regardless of the presence or absence of supply of electric power from the first power feeding socket 31. Accordingly, an electric power source of the battery management unit 2 is separated from an electric power source of the cell monitoring unit 3, and independent starting of the cell monitoring unit 3 can be performed by electric power from the second power feeding socket 32. At this time, only the cell monitoring unit 3 is started independently since the battery management unit 2 is not started unless power feeding from the first power feeding socket 31 is present.

[2-2. Communication Circuit]

Figure 4:
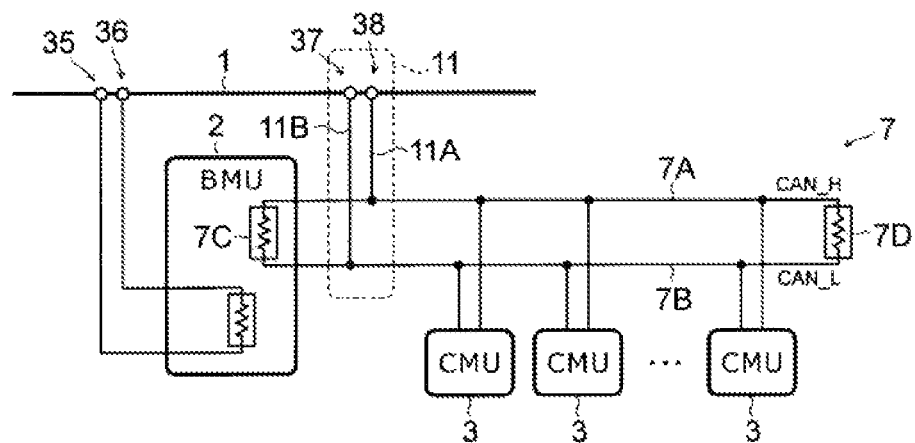
FIG. 4 is an electrical circuit diagram illustrating a communication circuit in FIG. 2.

FIG. 4 is an electrical circuit diagram (network diagram) illustrating a communication circuit 7 of the battery management unit 2 and the cell monitoring unit 3. Sockets 35 to 38 in the diagram respectively show sockets used for communication in the battery management unit 2 in plural sockets formed in the connector 18. In addition, the sockets 35, 36 of the embodiment are connection ports related to communication between the battery management unit 2 and an electronic controller of the vehicle side, and are formed independently from the communication circuit 7 between the battery management unit 2 and the cell monitoring unit 3.

The communication circuit 7 has, for example, a line bus structure in which a twist pair is formed by mutually winding a first communication line 7A (CAN_H) and a second communication line 7B (CAN_L). Each of the battery management unit 2 and the plural cell monitoring units 3 connected to this line bus is connected to both of the first communication line 7A and the second communication line 7B. The battery management unit 2 and the plural cell monitoring units 3 can be mutually communicated according to a preset priority or in any order. Both ends of the line bus are provided with terminating resistors 7C, 7D, and a reflected voltage inside the circuit is reduced. In addition, FIG. 4 illustrates the case where one terminating resistor 7C is built into the battery management unit 2.

Also, in this communication circuit 7, a first diagnostic circuit 11 for receiving a signal sent from each of the cell monitoring units 3 in the outside of the battery pack 1 is branched and formed, and is extended to an outer surface of the battery case 1B (an outer surface of the battery pack 1). The first diagnostic circuit 11 is provided with a first spare communication line 11A branched and formed from the first communication line 7A and a second pare communication line 11B branched and formed from the second communication line 7B. The socket 38 in the diagram is a terminal to which the first spare communication line 11A is connected, and the socket 37 is a terminal to which the second spare communication line 11B is connected. By connecting an external communication unit to these sockets 37, 38, a signal transferred from each of the cell monitoring units 3 can be intercepted even at the time of non-operation of the battery management unit 2.

[2-3. Electric Leak Detecting Circuit]

FIG. 5 is an electrical circuit diagram illustrating an electric leak detecting circuit 8 of the battery pack 1. Sockets 39, 40 in the diagram respectively show sockets related to electric leak detection in plural sockets formed in the connector 18. As described previously, the first electric leak detecting line 8A is branched and formed from the minus side circuit 5A of the side of the battery module 1C (the inside) than the contactor 6. Also, the second electric leak detecting line 8B is branched and formed from the minus side circuit 5A of the side of the connector 19 (the outside) than the contactor 6. The first electric leak detecting line 8A and the second electric leak detecting line 8B are connected to the battery management unit 2.

The battery management unit 2 diagnoses the presence or absence of an electric leak by measuring an electric leak resistance value (or an electric leak current value) between each of the first electric leak detecting line 8A and the second electric leak detecting line 8B and a ground (for example, the ground sockets 33, 34) in a low-voltage circuit of the battery pack 1. Or, the presence or absence of the electric leak is diagnosed by measuring an electric leak resistance value (or an electric leak current value) between the electric leak detecting line and a metal portion (for example, the battery frame 1E) of the battery pack 1 or a metal portion of the vehicle body.

In a normal state in which a low-voltage circuit is insulated from a high-voltage circuit, these insulation resistance values become a very large value (for example, 100 [kΩ] or more). On the other hand, when a state of insulation between the low-voltage circuit and the high-voltage circuit decreases, the insulation resistance value decreases. Consequently, the case where the insulation resistance value is, for example, less than or equal to a predetermined value can be diagnosed as an electric leak or the possibility of an electric leak.

Also, in this electric leak detecting circuit 8, a second diagnostic circuit 12 for checking the presence or absence of an electric leak in the outside of the battery pack 1 is branched and formed, and is extended to the outer surface of the battery case 1B (the outer surface of the battery pack 1). The socket 39 in the diagram is a terminal to which a first spare electric leak detecting line 12A branched and formed from the first electric leak detecting line 8A is connected, and the socket 40 is a terminal to which a second spare electric leak detecting line 12B branched and formed from the second electric leak detecting line 8B is connected. By measuring the electric leak resistance value between these sockets 39, 40 and the ground in the low-voltage circuit of the battery pack 1 (or, the metal portion of the battery pack 1), the presence or absence of the electric leak can be diagnosed even at the time of non-operation of the battery management unit 2.

In addition, since the first spare electric leak detecting line 12A is branched and formed from the minus side circuit 5A of the inside than the contactor 6, the first spare electric leak detecting line 12A can be used in diagnosis of an electric leak state without depending on a connection and disconnection of the contactor 6. On the other hand, since the second spare electric leak detecting line 12B is branched and formed from the minus side circuit 5A of the outside than the contactor 6, the second spare electric leak detecting line 12B can be used in diagnosis of an electric leak state at the time of connection of the contactor 6 (the time of closing the circuit).

[2-4. Current Value Detecting Circuit]

Figure 6:
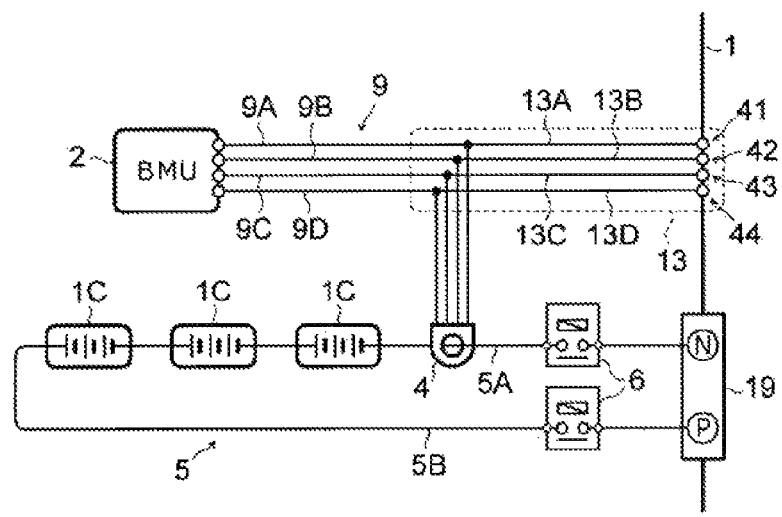
FIG. 6 is an electrical circuit diagram illustrating a current value detecting circuit in FIG. 2.

FIG. 6 is an electrical circuit diagram illustrating a current value detecting circuit 9 of the battery pack 1. Sockets 41 to 44 in the diagram respectively show sockets related to current value detection in plural sockets formed in the connector 18. A sensor power source line 9A, a ground line 9B, a first sensor line 9C and a second sensor line 9D are formed between the current sensor 4 and the battery management unit 2.

The sensor power source line 9A is a conductive wire for giving a driving voltage of the current sensor 4, and the ground line 9B is a conductive wire for giving a ground potential. Also, both of the first sensor line 9C and the second sensor line 9D are conductive wires for outputting a voltage signal of magnitude according to a value of current flowing through the high-voltage circuit 5, and are respectively designed to cope with the range of current values of the different orders. The battery management unit 2 acquires the current value of the high-voltage circuit 5 based on a voltage signal transferred from each of the first sensor line 9C and the second sensor line 9D with reference to voltages of the sensor power source line 9A and the ground line 9B.

Also, in this current value detecting circuit 9, a third diagnostic circuit 13 for acquiring information detected by the current sensor 4 in the outside of the battery pack 1 is branched and formed, and is extended to the outer surface of the battery case 1B (the outer surface of the battery pack 1). The third diagnostic circuit 13 is provided with a spare sensor power source line 13A branched and formed from the sensor power source line 9A, a spare ground line 13B branched and formed from the ground line 9B, a first spare sensor line 13C and a second spare sensor line 13D branched and formed from each of the first sensor line 9C and the second sensor line 9D.

The sockets 41 to 44 in the diagram are terminals connected to the spare sensor power source line 13A, the spare ground line 13B, the first spare sensor line 13C and the second spare sensor line 13D, respectively. By connecting an external electronic controller to these sockets 41 to 44, a signal transferred from the current sensor 4 can be read even at the time of non-operation or failure of the battery management unit 2.

[3. Action and Effect]

(1) The battery pack 1 described above is provided with the battery management unit 2 for managing states of the plural battery modules 1C and cells 1D, and the information transfer circuit (the communication circuit 7, the electric leak detecting circuit 8, the current value detecting circuit 9, etc.) connected to this battery management unit 2. Also, the diagnostic circuit (the first diagnostic circuit 11, the second diagnostic circuit 12, the third diagnostic circuit 13, etc.) is branched and formed from this information transfer circuit, and is connected to the low-voltage system connector 18 formed on an outer surface of the battery case 1B.

By such a circuit configuration, information on the information transfer circuit can be acquired from the outside of the battery pack 1 through the diagnostic circuit. Since this diagnostic circuit is branched and formed from the information transfer circuit, correct information circuit can be acquired without depending on an operating state or a failure state of the battery management unit 2. That is, even at the time of non-operation or failure of the battery management unit 2, the states of the battery modules 1C and the cells 1D of the inside of the battery pack 1 can be diagnosed, and serviceability and maintainability of the battery pack 1 can be improved.

Also, since information transferred to the battery management unit 2 can be received in the outside of the battery pack 1, a failure of the battery management unit 2 itself can be diagnosed objectively. Accordingly, for example, it becomes easy to determine whether the battery management unit 2 fails or the cell monitoring unit 3, the battery module 1C or the cell 1D fails, and serviceability and maintainability of the battery pack 1 can be improved.

(2) In the battery pack 1 described above, the first diagnostic circuit 11 is branched and formed from the communication circuit 7 for making connection between the battery management unit 2 and the cell monitoring unit 3 as shown in FIG. 4. Accordingly, information outputted from all the cell monitoring units 3 can be read by only adding communication lines corresponding to a small number of communication lines used in communication between electronic controllers.

Consequently, a structure of the battery pack 1 does not become complicated and the cost can be reduced. Also, since all pieces of information managed in the cell monitoring units 3 can be received in the outside of the battery pack 1, temperatures or voltages of the individual cells 1D can be diagnosed correctly, and serviceability and maintainability of the battery pack 1 can be improved.

(3) The battery pack 1 described above is provided with the second power source line 15A for supplying electric power to only the cell monitoring unit 3 as shown in FIG. 3. Also, the relay 14 for breaking the CMU side power source line 10B at the time of power feeding from the second power source line 15A is interposed in the first power source line 10. By such a circuit structure, an electric power source of the battery management unit 2 can be separated from an electric power source of the cell monitoring unit 3, and only the cell monitoring unit 3 can be started independently from the battery management unit 2.

In addition, in the case of a circuit structure in which the electric power source of the battery management unit 2 cannot be separated from the electric power source of the cell monitoring unit 3, meaningless information remains outputted from the battery management unit 2 failing, and information from the cell monitoring unit 3 probably cannot be retrieved. On the other hand, in the battery pack 1 described above, the cell monitoring unit 3 can be started while pausing the battery management unit 2. Consequently, interference with the communication circuit 7 by the battery management unit 2 can be prevented to read correct information, and serviceability and maintainability of the battery pack 1 can be improved.

(4) The battery pack 1 described above is provided with the second diagnostic circuit 12 branched and formed from the electric leak detecting circuit 8 as shown in FIG. 5. By such a circuit configuration, even at the time of non-operation of the battery management unit 2, the extent of insulation between a high-voltage system and a low-voltage system can be diagnosed through the second diagnostic circuit 12, and an electric leak of the battery pack 1 can be detected. Consequently, serviceability and maintainability of the battery pack 1 can be improved.

(5) Particularly, the battery pack 1 described above is provided with the first spare electric leak detecting line 12A branched and formed from the first electric leak detecting line 8A located in the inside than the contactor 6. By diagnosing the extent of insulation using this first spare electric leak detecting line 12A, the presence or absence of an electric leak of the inside of the battery pack 1 can be diagnosed even in a state in which the battery pack 1 is detached from a vehicle (a state in which the contactor 6 is disconnected). Consequently, serviceability and maintainability of the battery pack 1 can be improved.

(6) On the other hand, the battery pack 1 described above is also provided with the second spare electric leak detecting line 12B branched and formed from the second electric leak detecting line 8B located in the outside than the contactor 6. By diagnosing the extent of insulation using this second spare electric leak detecting line 12B, an electric leak of the inside of the battery pack 1 in a vehicle-mounted state (a mounted state) can be diagnosed with high accuracy. Consequently, serviceability and maintainability of the battery pack 1 can be improved.

(7) In the battery pack 1 described above, the third diagnostic circuit 13 is branched and formed from the current value detecting circuit 9 between the current sensor 4 and the battery management unit 2 as shown in FIG. 6. By such a circuit configuration, even at the time of non-operation of the battery management unit 2, detection information on the current sensor 4 can be directly acquired through the third diagnostic circuit 13. Consequently, serviceability and maintainability of the battery pack 1 can be improved.

[4. Modified Example]

Regardless of the embodiment described above, various modifications can be made without departing from the gist. In each configuration of the present embodiment, a choice can be made from the modifications as necessary, or the modifications may be combined properly.

Figure 7:
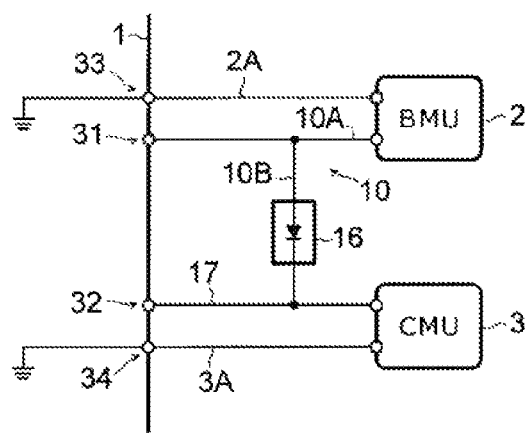
FIG. 7 is an electrical circuit diagram illustrating a circuit configuration according to a modified example.

In the power source circuit illustrated in FIG. 3, the electric power source of the battery management unit 2 is separated from the electric power source of the cell monitoring unit 3 using the relay 14, but a diode 16 may be used instead of the relay 14. For example, as shown in FIG. 7, the second power feeding socket 32 in the embodiment described above is connected to the CMU side power source line 10B by a spare power source line 17. Also, on the CMU side power source line 10B, the diode 16 is interposed in any position of the side of the BMU side power source line 10A than a point of connection to the spare power source line 17. The diode 16 is formed so as to permit power feeding from the side of the first power feeding socket 31 to the side of the cell monitoring unit 3 and break a backward current.

According to such a circuit configuration, the battery management unit 2 can be prevented from being started by power feeding from the second power feeding socket 32. Consequently, independent starting of only the cell monitoring unit 3 can be implemented by a simpler circuit configuration than that of the embodiment described above.

Also, in the embodiment described above, the battery pack 1 for vehicle is illustrated, but the scope of the battery pack 1 described above is not limited to only the vehicle (an electric vehicle or a hybrid vehicle). The battery pack 1 can be applied to, for example, a computer, an electronic apparatus, electrically-driven equipment or an electrically-driven unit equipped with the battery pack 1 with the built-in battery management unit 2.

In the battery pack of the invention as described above, the diagnostic circuit is branched and formed from the information transfer circuit for transferring information about performance of the secondary battery to the battery management unit, and is extended to the outer surface of the case. Accordingly, the information about the secondary battery can be read through the diagnostic circuit without the intervention of the battery management unit. Consequently, even at the time of failure of the battery management unit, a state of the secondary battery of the inside of the battery pack can be diagnosed, and serviceability and maintainability of the battery pack can be improved.

What is claimed is:

1. A battery pack, comprising:
a battery case for housing secondary batteries inside the battery case;
a battery management unit for managing states of the secondary batteries;
an information transfer circuit which is connected to the battery management unit and transfers information about the secondary batteries to the battery management unit;
a diagnostic circuit which is branched and formed from the information transfer circuit and is extended to an outer surface of the battery case;
a cell monitoring unit for monitoring states of the individual secondary batteries,
a first power source line for supplying electric power to both of the battery management unit and the cell monitoring unit;
a second power source line for supplying electric power to only the cell monitoring unit; and
a breaking unit which is interposed in both of the second power source line and a portion between the cell monitoring unit and the battery management unit in the first power source line and breaks power feeding from the first power source line to the cell monitoring unit at the time of power feeding from the second power source line,
wherein the information transfer circuit has a communication circuit for making connection between the battery management unit and the cell monitoring unit, and the diagnostic circuit has a first diagnostic circuit branched and formed from the communication circuit.

2. The battery pack according to claim 1, wherein
the information transfer circuit has an electric leak detecting circuit which is formed between the battery management unit and a high-voltage circuit related to charge and discharge of the secondary batteries and detects an electric leak from the high-voltage circuit, and
the diagnostic circuit has a second diagnostic circuit branched and formed from the electric leak detecting circuit.

3. The battery pack according to claim 2, wherein the electric leak detecting circuit has a first electric leak detecting circuit connected to a portion of the high-voltage circuit between a contactor interposed in the high-voltage circuit and one of the secondary batteries that is closest to the contactor.

4. The battery pack according to claim 2, wherein
the electric leak detecting circuit has a second electric leak detecting circuit connected to the high-voltage circuit, wherein a contactor is interposed in the high-voltage circuit between the second leak detecting circuit and one of the secondary batteries that is closest to the contactor.

5. The battery pack, comprising:
a battery case for housing secondary batteries inside the battery case;
a battery management unit for managing states of the secondary batteries;
an information transfer circuit which is connected to the battery management unit and transfers information about the secondary batteries to the battery management unit;
a diagnostic circuit which is branched and formed from the information transfer circuit and is extended to an outer surface of the battery case;
a cell monitoring unit for monitoring states of the-individual secondary batteries;
a first power source line for supplying electric power to both of the battery management unit and the cell monitoring unit;
a second power source line for supplying electric power to only the cell monitoring unit; and
a breaking unit which is interposed in both of the second power source line and a portion between the cell monitoring unit and the battery management unit in the first power source line and breaks power feeding from the first power source line to the cell monitoring unit at the time of power feeding from the second power source line.

6. The battery pack according to claim 5, further comprising:
a current sensor for detecting a current value related to charge and discharge of the secondary battery,
wherein the information transfer circuit has a current value detecting circuit for making connection between the current sensor and the battery management unit, and
the diagnostic circuit has a third diagnostic circuit branched and formed from the current value detecting circuit.

7. The battery pack according to claim 5, wherein the diagnostic circuit provides access to the information on the information transfer circuit from an outside of the battery pack.

* * * * *